United States Patent [19]
Gobat

[11] Patent Number: 5,933,836
[45] Date of Patent: Aug. 3, 1999

[54] DATABASE QUALITY MANAGEMENT SYSTEM

[75] Inventor: James M. Gobat, Colts Neck, N.J.

[73] Assignee: Lucent Technologies Inc., Murray Hill, N.J.

[21] Appl. No.: 08/648,647

[22] Filed: May 16, 1996

[51] Int. Cl.$^6$ ............................................. G06F 17/00
[52] U.S. Cl. ..................... 707/201; 707/200; 707/101; 707/10
[58] Field of Search ....... 707/1–206; 395/200.3–200.83

[56] References Cited

U.S. PATENT DOCUMENTS

| | | | |
|---|---|---|---|
| 5,247,651 | 9/1993 | Clarisse | 395/800 |
| 5,307,484 | 4/1994 | Baker et al. | 395/600 |
| 5,412,756 | 5/1995 | Bauman et al. | 395/50 |
| 5,461,559 | 10/1995 | Heyob et al. | 364/149 |
| 5,537,590 | 7/1996 | Amado | 395/600 |
| 5,555,244 | 9/1996 | Gupta et al. | 370/432 |
| 5,673,265 | 9/1997 | Gupta et al. | 370/432 |

Primary Examiner—Wayne Amsbury
Assistant Examiner—David Yiuk Jung
Attorney, Agent, or Firm—Frederick B. Luludis; Guy H. Eriksen

[57] ABSTRACT

A facility is provided for maintaining automatically the integrity of data associated with respective data applications. The facility achieves this result by providing a plurality of data modules for interfacing respective ones of the applications with their associated data bases such that, in response to receipt of a data request from one of the applications, the respective interfacing module unloads the requested data from the associated data base. The interfacing module then communicates with other ones of the modules to determine if the requested data is consistent with related data stored in their associated data bases. If the requested data is found to be so consistent, then the data is supplied to the requesting application. If not, then the interfacing module corrects the inconsistency in accord with predefined data rules, and then supplies the corrected data to the requesting data application.

12 Claims, 8 Drawing Sheets

FIG. 3

| DATA ELEMENT | DATA ELEMENT NAME | DATA ELEMENT TYPE |
|---|---|---|
| TRANSMISSION PATH ID | path_id | S |
| PATH FACILITY TYPE | path_type | S |
| PATH END POINT 1 | path_end_1 | S |
| PATH END POINT 2 | path_end_2 | S |
| PATH OPERATIONAL STATUS | path_status | S |
| | | |
| CIRCUIT ID | ckt_id | P |
| CIRCUIT TYPE | ckt_type | L |
| CIRCUIT END POINT 1 | ckt_end_1 | L |
| CIRCUIT END POINT 2 | ckt_end_2 | L |
| CIRCUIT SEGMENT 1 ID | ckt_seg_1 | P |
| CIRCUIT SEGMENT 2 ID | ckt_seg_2 | P |
| CIRCUIT SEGMENT 3 ID | ckt_seg_3 | P |
| CIRCUIT SEGMENT OPERATIONAL STATUS | ckt_status | P |
| | | |

| DATA ELEMENT DESCRIPTION | DATA ELEMENT NAME | DATA ELEMENT COPIES AND OWNERSHIP ATTRIBUTES BY DATA BASE | | |
|---|---|---|---|---|
| | | FACILITIES DATA BASE | PROVISIONING DATA BASE | MAINTENANCE DATA BASE |
| TRANSMISSION PATH ID | path_id | P | S | S |
| PATH FACILITY TYPE | path_type | P | S | S |
| PATH END POINT 1 | path_end_1 | P | S | S |
| PATH END POINT 2 | path_end_2 | P | S | S |
| | | | | |
| CIRCUIT ID | ckt_id | -- | P | S |
| CIRCUIT TYPE | ckt_type | -- | L | -- |
| CIRCUIT END POINT 1 | ckt_end_1 | -- | L | -- |
| CIRCUIT END POINT 2 | ckt_end_2 | -- | L | -- |
| CIRCUIT SEGMENT 1 ID | ckt_seg_1 | -- | P | S |
| CIRCUIT SEGMENT 2 ID | ckt_seg_2 | -- | P | S |
| CIRCUIT SEGMENT 3 ID | ckt_seg_3 | -- | P | S |
| CIRCUIT OPERATIONAL STATUS | ckt_status | -- | P | S |
| | | | | |
| TROUBLE RECORD ID | tbl_id | -- | -- | L |
| TROUBLE PATH ID | tbl_path | -- | -- | L |
| DATE LAST TROUBLE | tbl_date_rpt | -- | -- | L |
| DATE LAST TROUBLE CLEARED | tbl_date_clr | -- | -- | L |
| PATH OPERATIONAL STATUS | path_status | S | S | P |

| DATA ELEMENT DESCRIPTION | DATA ELEMENT NAME | | |
|---|---|---|---|
| | FACILITIES DATA BASE | PROVISIONING DATA BASE | MAINTENANCE DATA BASE |
| TRANSMISSION PATH ID | F_path_id | P_path_id | M_path_id |
| PATH FACILITY TYPE | F_path_type | P_path_type | M_path_type |
| PATH END POINT 1 | F_path_end_1 | P_path_end_1 | M_path_end_1 |
| PATH END POINT 2 | F_path_end_2 | P_path_end_2 | M_path_end_2 |
| | | | |
| TROUBLE RECORD ID | -- | -- | M_tbl_id |
| TROUBLE PATH ID | -- | -- | M_tbl_path |
| DATE LAST TROUBLE REPORTED | -- | -- | M_tbl_date_rpt |
| DATE LAST TROUBLE CLEARED | -- | -- | M_tbl_date_clr |
| PATH OPERATIONAL STATUS | F_path_status | P_path_status | M_path_status |

```
Do for Each Circuit Segment i=1 to N:
Do for Each Candidate Path j=1 to N:

If P_path_status=OK and F_path_status=OK and M_path_status=OK
    then reserve F_path_id as ckt_segment_i;

If P_path_status=OK and F_path_status=OK and M_path_status=NOK
    then refer case to Data Reconciliation Processor
         and select alternate path;

If P_path_status=OK and F_path_status=NOK and M_path_status=OK
    then if M_tbl_date_clr is less than seven days before current date
         then update F_path_status to OK
              and reserve F_path_id as ckt_segment_i;
         else refer case to Data Reconciliation Processor
              and select alternate path;

If P_path_status=OK and F_path_status=NOK and M_path_status=NOK
    then update P_path_status to NOK
         and select alternate path;

If P_path_status=NOK and F_path_status=OK and M_path_status=OK
    then if M_tbl_date_clr is less than seven days before current date
         then update P_path_status to OK
              and reserve F_path_id as ckt_segment_i;
         else refer case to Data Reconciliation Processor
              and select alternate path;

If P_path_status=NOK and F_path_status=OK and M_path_status=NOK
    then update F_path_status to NOK
         and select alternate path;

If P_path_status=NOK and F_path_status=NOK and M_path_status=OK
    then refer case to Data Reconciliation Processor
         and select alternate path;

If P_path_status=NOK and F_path_status=NOK and M_path_status=NOK
    then select alternate path;
```

FIG. 8

Do for Each Case Referred from an Intelligent Data Module:

If P_path_status=OK and F_path_status=OK and M_path_status=NOK
  then if M_tbl_date_rpt is less than seven days before current date
    then if M_tbl_date_clr is pending
      then update F_path_status to NOK
        and update P_path_status to NOK
     else update M_path_status to OK
   else request manual verification;

If P_path_status=OK and F_path_status=NOK and M_path_status=OK
  then if M_tbl_date_clr is less than seven days before current date
    then update F_path_status to OK
    else if M_path_type = F_path_type
      then if [M_path_end_1,M_path_end_2]=[F_path_end_1, F_path_end_2]
        then update F_path_status to OK
        else request Maintenance Data Base check
      else request Maintenance Data Base check;

If P_path_status=NOK and F_path_status=OK and M_path_status=OK
  then if M_tbl_date_clr is less than seven days before current date
    then update P_path_status to OK
    else if M_path_type = F_path_type
      then if [M_path_end_1, M_path_end_2]=[F_path_end_1, F_path_end_2]
        then update P_path_status to OK
        else request Maintenance Data Base check
      else request Maintenance Data Base check;

If P_path_status=NOK and F_path_status=NOK and M_path_status=OK
  then if M_tbl_date_clr is less than seven days before current date
    then update P_path_status to OK
      and update F_path_status to OK
   else request manual verification;

DATABASE QUALITY MANAGEMENT SYSTEM

FIELD OF THE INVENTION

The invention relates to managing related data respectively stored in a plurality of data bases.

BACKGROUND OF THE INVENTION

It is often the case that related data may be stored in different data bases. For example, a bank may store related data such as account information, credit history, customer data, etc. in different data bases. It can be appreciated that over time related data associated with a particular account (i.e. a customer) may become inconsistent across the different data bases. As such, when data associated with the account is selected by a particular banking application from one of the data bases and processed, the end result may be incorrect because the selected data is not consistent with its associated data stored in the other data bases. As another example, in telephone applications different data that is related in some way, e.g. facility, provisioning, and maintenance data, may be stored in different data bases. If a person enters a subscription for telephone service, the facilities to implement the subscription are selected from a provisioning data base. However, the selected facilities may not actually be available. The reason for this may be, for example, that the facilities were marked unavailable due to maintenance activity and shown as such in the maintenance data base, but were inadvertently left marked as available in the provisioning data base. As such, a craftsperson would be unsuccessful implementing the requested service as a result of trying to use facilities that were not available. It can be appreciated that the problem of inconsistent data across multiple data bases may be both difficult and costly to correct.

SUMMARY OF THE INVENTION

I deal with the foregoing problem using what I call an Intelligent Data Module (IDM) as an interface between an application and its associated data base, in which, in accord with an aspect of the invention, the Intelligent Data Modules communicate with one another to determine if data requested by an associated application is consistent with related data stored in the other data bases before the application is allowed access to the data. If the data is found to be inconsistent with its related data, then the Intelligent Data Module, in accord with another aspect of the invention, may invoke either a local or a remote data reconciliation function to process the related data to make it consistent.

Other aspects of the invention will be made apparent in the following detailed description and ensuing claims.

BRIEF DESCRIPTION OF THE DRAWING

In the drawing:

FIG. 3 is an illustrative example of a Data Element Table that is stored in an application database in the system of FIG. 1;

FIG. 4 is an illustrative example of a Master Data Element Table that is stored in the data directory of FIG. 1;

FIG. 5 is an illustrative example of a data record that is used to define a respective data object and that is stored in the data directory Table of FIG. 1;

FIG. 7 is an example of various logical rules which may be encoded into the rule base associated with an Intelligent Data Module of FIG. 1; and FIG. 8 is an example of various logical rules which may be encoded into the rule base associated with the Data Reconciliation Processor of FIG. 1.

DETAILED DESCRIPTION

An illustrative embodiment of the invention will be discussed in the context of an application involving the provisioning of telephone service, which relies on related data stored in a plurality of different data bases, including, for example, facilities, provisioning, and maintenance data bases. It is to be understood that such a discussion is not to be taken as a limitation of the claimed invention, since it is merely one application thereof.

Figure 1:
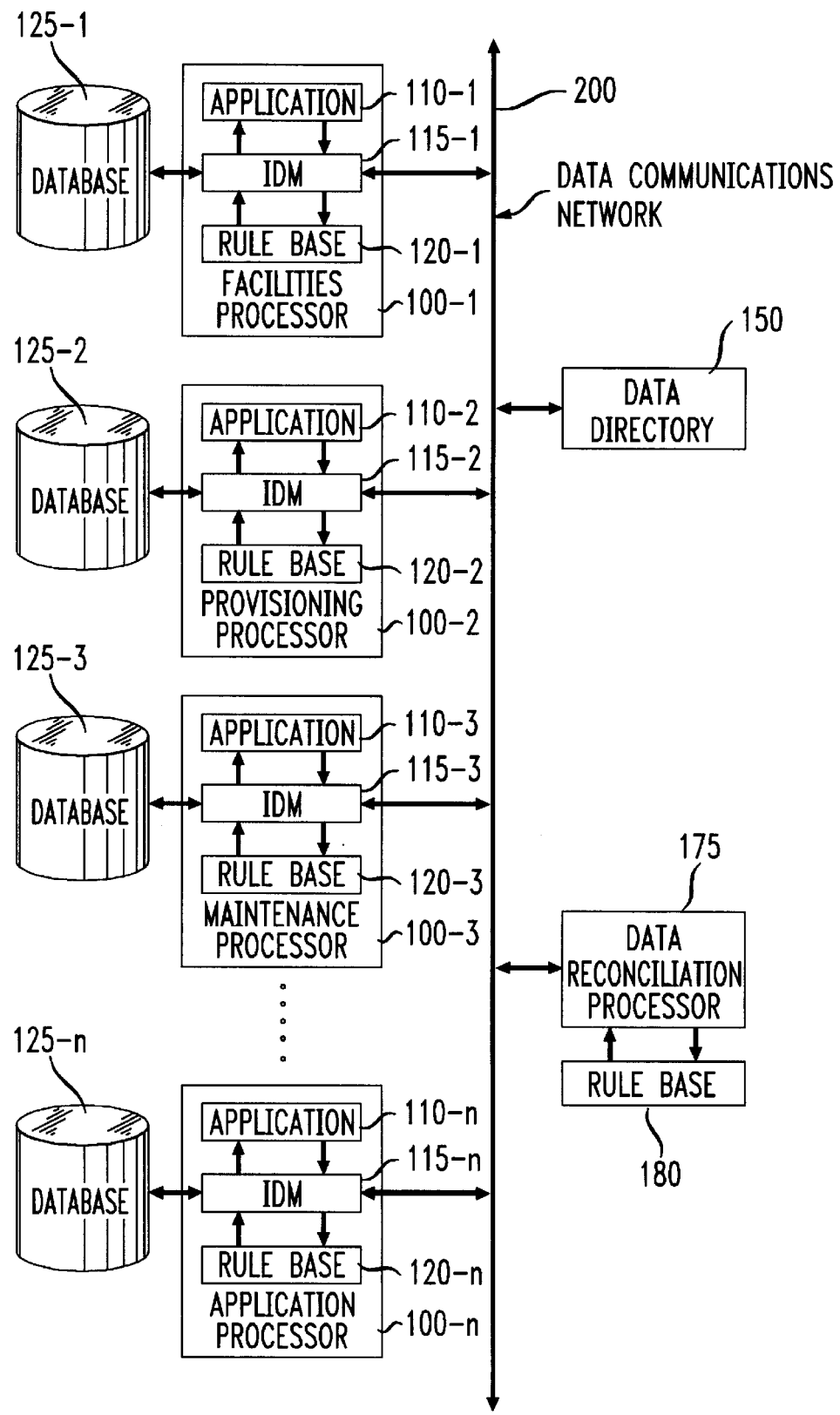
FIG. 1 is a block diagram of a system of operational applications in which the principles of the invention may be practiced.

With the foregoing in mind, data bases 125-1 through 125-N shown in FIG. 1 are respectively associated with processors 100-1 through 100-N. Processors 100-1 through 100-N respectively include Intelligent Data Modules (IDMs) 115-1 through 115-N, each of which supports a respective application. For example, IDMs 115-1 through 115-3 respectively support operations applications 110-1 through 110-3, identified in FIG. 1 as Facilities, Provisioning, and Maintenance applications, respectively. The other IDMs 115-4 through 115-N support other operations applications not identified herein. It is seen that IDMs 115-1 through 115-N are driven by respective rule bases 120-1 through 120-N, in which a rule base is a set of logically-structured rules which directs its associated IDM what actions to take in a given situation, based upon the consistency of a set of related data elements whose values were retrieved from respective ones of the data bases 125-1 through 125-N.

For example, a telephone company operations application 110-2 may initiate a transaction to request data that is needed to perform a particular operational task, such as the provisioning of new telephone service. In accord with an aspect of the invention, the application directs the request to its associated IDM, e.g. IDM 115-2. IDM 115-2, in turn, retrieves the data requested by the received transaction, and all of the data logically related to the data requested by the received transaction. Some or all of this logically-related data will most likely have to be retrieved from data bases other than data base 125-2. IDM 115-2, upon receipt of the retrieved data, processes the data in accord with particular rules stored in its associated rule base 120-2 to determine if the retrieved data is logically consistent. If the data is found to be consistent, then IDM 115-2 supplies the requested data to its associated operations application 110-2 to complete the desired operational task. Otherwise, IDM 115-2 proceeds in accord with one of a number of different options specified by its associated rule base 120-2, including the option to suspend the request for the data until the data is reconciled, as will be discussed in detail below.

It is seen from FIG. 1 that an IDM 115$i$, e.g. IDM 115-1, is disposed between its associated operations application 110-$i$ and the data base 125-$i$, e.g. data base 125-1, that supports the operations application 110-$i$. This allows each IDM 115$i$ to control the flow of data going to and from its associated application, so that synchronization of data elements distributed across the data bases in the system may be made a condition of proceeding with the use of data in completing any operational task of the application. IDM 115-1 through 115-N maintain data synchronization by processing each data transaction in accordance with rules encoded in their respective associated rule bases 120-i. (Such rules are generated for each IDM 115*i* by subject matter experts who understand the purpose and functions of the associated application, the logical relationships among the data elements in all data bases in the system, and the relative operational risks and impacts associated with completing certain operational tasks when the data elements required to complete those tasks may or may not be synchronized with logically-related data elements in other data bases in the system.)

For an IDM 115*i* to perform its intended function, certain attributes and relationships among data elements in the system needs to be defined and recorded. One such attribute is what I call "ownership", which indicates for each data element whether single or multiple copies of the data element exist throughout the data bases in the system, and, if multiple copies exist, then which copy is considered to be the "primary" copy, i.e., the copy that is believed to be more reliably accurate than that of any other copy. The data base containing the primary copy of a particular data element, therefore, is considered to be the "owner" of that data element. (It is noted that subject matter experts who design a system of applications also designate whether a data element is a primary copy and thereby identify which data base owns that data element.) A second aspect is what I call a "data object", that is defined herein to be the set of all the data elements logically related to the data element(s) required by an operations application to complete a desired operational task, including the data element(s) originally requested, as will be described in detail below.

Figure 2:
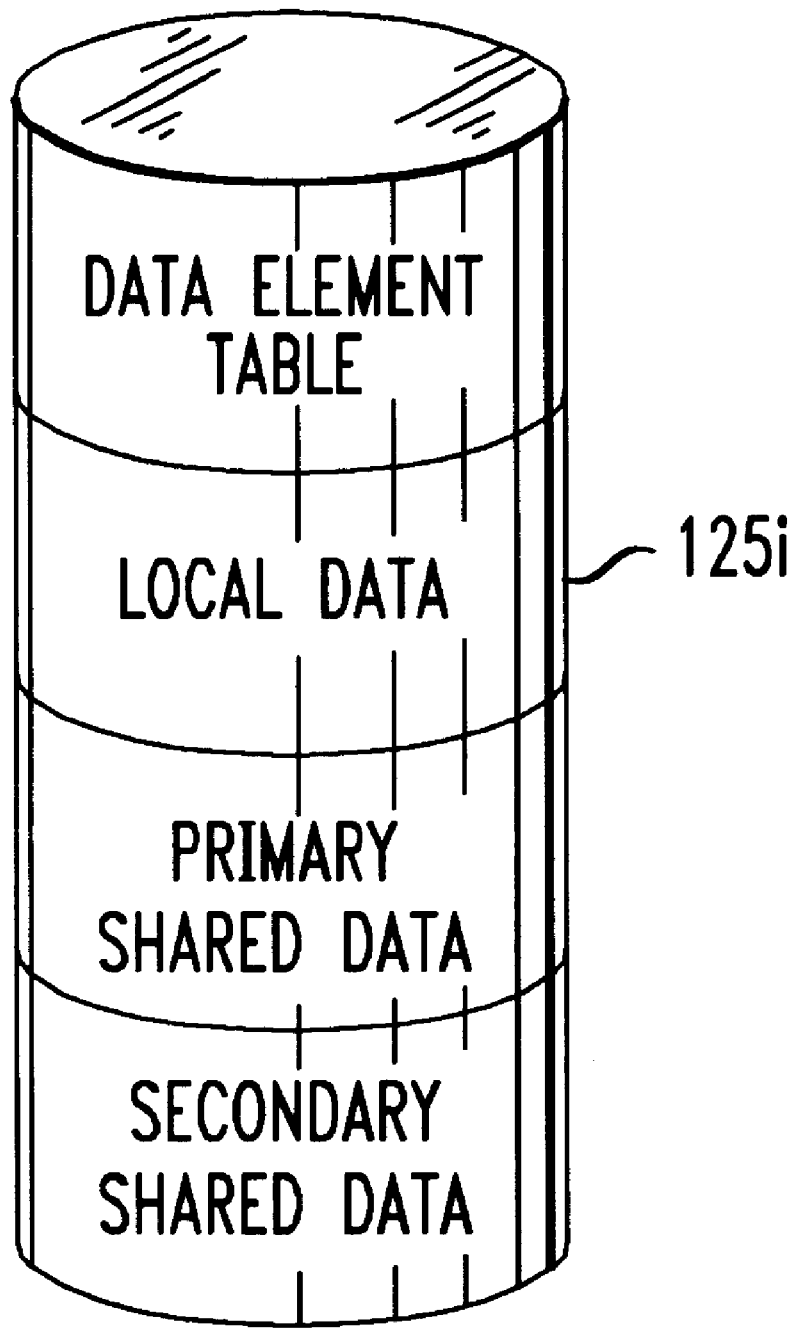
FIG. 2 illustrates the logical partitioning of data in a data base employed in the system of FIG. 1.

Each data element that is stored in a data base 125-i is associated with an attribute that defines the ownership characteristics of that particular copy of the data element. For example, a data element may be defined as being (a) "local data" if it is not stored in any other data base, (b) "primary shared data" if it is stored in multiple data bases, but the copy stored in data base 125*i* is the primary copy, or (c) "secondary shared data" if it is stored in multiple data bases, but the primary copy is stored in a data base other than data base 125-i. Such illustrative identification of all of the data elements in a data base 125-i as either local, primary shared, or secondary shared is illustrated in FIG. 2. Specifically, the information that characterizes a data element in the data base as local, primary shared, or secondary shared is shown as being stored in a respective segment of the data base designated a "Data Element Table". (It is to be understood of course that FIG. 2 illustrates one way in which such information may be stored in a data base, and that any other similar storage arrangement may be used as long as the stored information may be accessed and used in accord with the principles of the invention.)

An illustrative example of a data element table is shown in FIG. 3, which is described in detail below.

One illustrative use of a data element table that is stored in a data base 125-i allows the associated IDM 115*i* to identify if other copies of data elements requested by an application exist in other data bases, and, if so, preserves data synchronization across the data bases in accord with specified rules stored in its associated rule base 120*i*. Thus, IDM 115*i*, in a conventional manner, retrieves the ownership attributes associated with all requested data elements from the data element table 300 stored in its associated data base 125-i. If all the requested data elements are local data, then it is unlikely that the data elements will be inconsistent with data elements in other data bases. In this event, then, IDM 115*i* may be instructed by its associated rule base 120-i to retrieve the data elements themselves from data base 125-i, and pass them directly to application 110-i without further checking the data elements for consistency. It is also possible that the rule base may include a number of rules designed to check for logical consistency between data elements, even though the set of local data elements were retrieved from the same data base 125-i. In this event, the processing of these local data elements would be similar to that for data elements retrieved from multiple data bases, as discussed below. However, in most instances there exists in other data bases a number of data elements which either are copies of, or are logically related to, the data elements stored in data base 125-i. The respective IDM 115*i*, therefore, needs to identify the related data elements, retrieve them, and process them in accord with the rules stored in its associated rule base 120-i to determine if the data elements are consistent with one another.

In the event that an application 110-i has to modify a particular shared data element, then "ownership" is used to ensure that all copies of that data element are also modified. If an IDM 115*i* receives such a request from its associated application, then the IDM 115*i* first identifies the number and location of all such copies of that data element. Since the data element table that is in a particular data base identifies the ownership attributes only for the data elements stored in its "own" data base, then the IDM 115*i* must use another mechanism to be able to locate conveniently the other copies of the data element. One such mechanism may be realized by storing centrally the information in all of the data element tables 300 in the system as well as providing a cross-reference identifying logically-related shared data elements. This is done using what I call a "master data element table" that is stored in data directory 150 (FIG. 1).

The master data element table 400 shown in FIG. 4, more particularly, provides a comprehensive cross-reference for all data elements stored in all of the system data bases 115*i*. For a shared data element, master data element table 400 identifies the number, locations, and ownership attributes of all copies of the shared data element across all data bases 125*i* in the system. The Master data element table thus allows an IDM 115*i* to retrieve in one transaction with the Data directory all the data element information needed to complete the modification of a shared data element. An example of the information contained in the Master data element table is shown in FIG. 4.

For example, whenever an IDM 115*i* needs to modify a particular shared data element, IDM 115*i* must first determine from the data element table 300 stored in its associated data base 125*i* if the data element to be updated is a shared data element. If so, then IDM 115*i* must form and send a message to the Data directory 150 requesting the names and locations of all copies of the shared data element resident in other data bases and identified in the master data element table 400 stored in directory 150. Data directory 150, in turn, accesses the requested information and returns it to IDM 115*i*. If, on the other hand, the shared data element is stored in database 125*i* associated with IDM 115*i* and is the primary shared copy, then IDM 115*i* in accord with rules specified in its associated rule base 120*i* may update immediately that copy of the shared element. IDM 115*i* then sends a copy of the updated data element to the other IDMs 115 to update the secondary shared data element copies stored in their respective data bases 125. If, however, the shared data element that is stored in data base 125*i* is a secondary shared copy, then IDM 115*i*, in accord with the rule specified in its associated rule base 120*i*, must obtain permission to update the data element from the IDM 115 having ownership of the primary shared copy. Such permission may be granted immediately upon request, or may trigger another series of actions by the latter IDM 115 before permission is either granted or rejected.

The description of the data element tables and Master data element table in the paragraphs and example above is not intended to define or constrain the method in which this information is included in the system architecture, but merely to construct a convenient reference model for describing the workings of other aspects of the invention.

(It is noted that the foregoing discussion of tables 300 and 400 is not to be construed as a limitation since there may be a number of architectural alternatives which could be used to implement either data table. For example, in some applications, it may be more convenient to provide only master data element table 400 and not data element tables 300. In this instance, an IDM 115*i* would have to query master data element table 400 each time it needs to identify a data element. Alternatively, a copy of a master data element table 400 may be stored in each of the data bases 125 or IDMs 115.)

A data object, as defined above, is central to the preservation of data synchronization across all data bases in the system. A data object for a particular operational task is the complete set of data elements within which data consistency needs to be validated to ensure data quality is being preserved while the operational task is being completed. Data consistency within a data object is validated through application of the rules designed for this purpose. To ensure the preservation of data quality across a system of applications, a data object needs to be defined for each operational task which either uses or affects critical data elements. While data objects will be different for different operational tasks, the definition of a data object for a task needs to be standardized. For this reason, the definitions of data object for respective system operational tasks may be stored in data directory 150, as will be discussed below.

Storing the definition of a data object in data directory 150 provides a means for an IDM 115*i* to identify and locate a desired data element which is a part of the data object defined for a particular operational task. An IDM 115*i* may do this in the following manner.

Specifically, the unique identification associated with all data elements forming a data object are stored as a record in data directory 150. (If desired, the data object definition might also include for each data element its ownership characteristics (e.g. local vs. primary shared vs. secondary shared)). In a data directory record, a referenced data element may be described by, for example, the identity (e.g. the conventional addressable name) of the data base storing the data element, and the identity (e.g. the conventional addressable name) of the data element in that data base. A logical illustration of such a data record stored in data directory 150 is shown in FIG. 5. Record 500 is used to define a data object for a task entitled Circuit Provisioning.

Figure 6:
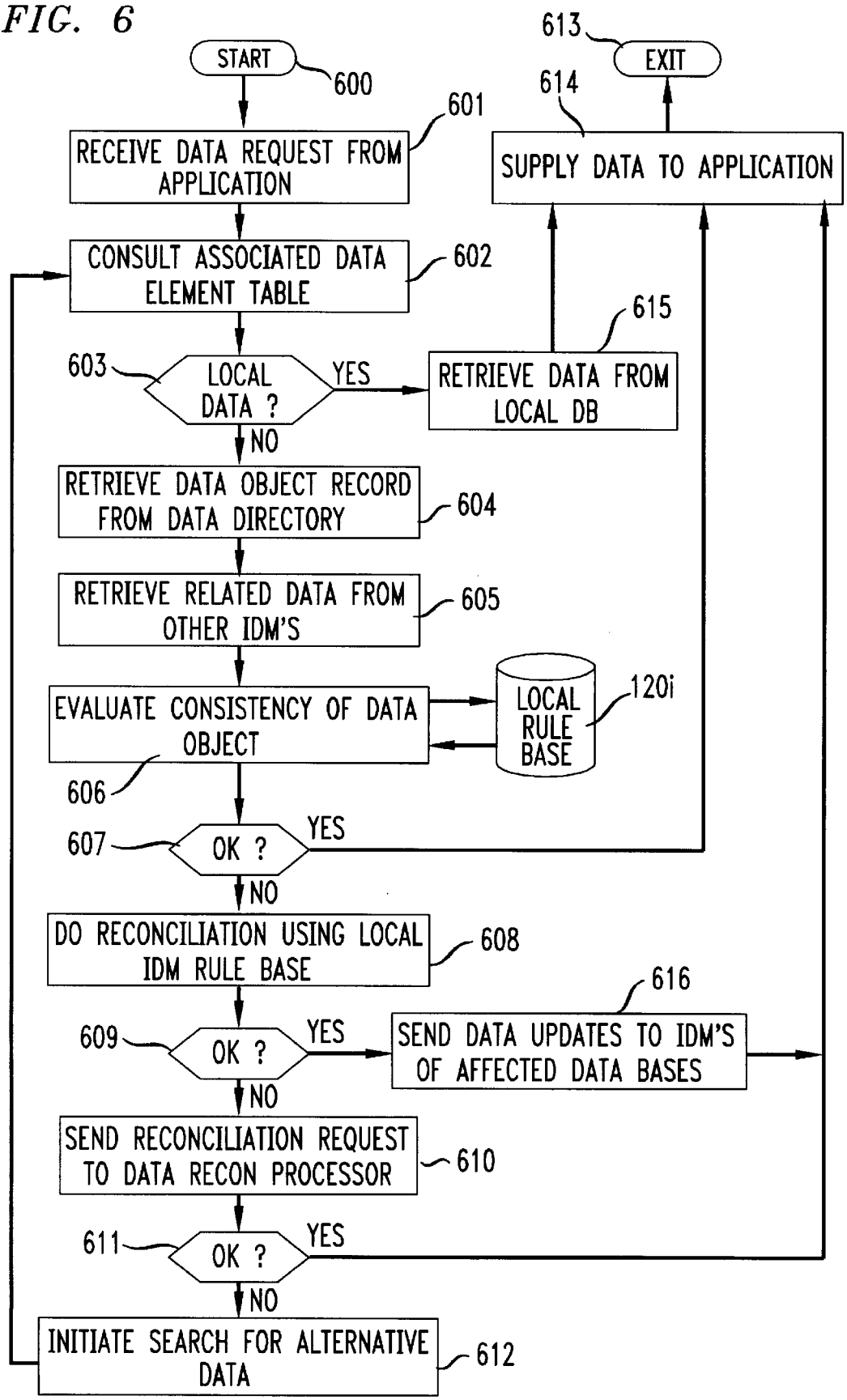
FIG. 6 illustrates in a flowchart form the program which processes a request for application data in accord with the principles of the invention.

A flowchart of an illustrative software program which implements the principles of the invention in an IDM 115*i*, e.g., 115-1, is shown in FIG. 6. Specifically, responsive to receipt of a request for particular operational data from its associated application 110-1, the program is entered at block 600 and proceeds to 601 to receive the data request. The program (block 602) then consults its associated data element table 300 (stored in its associated data base 125*i* as mentioned above) to determine if the requested data elements are local data or shared data (either primary or secondary). If the program (block 603) determines that the requested data elements are all local, then program (block 615) retrieves the requested data elements from its associated data base 125*i*, and supplies (block 614) the retrieved result in a conventional manner to the requesting application.

If the program determines that some of the data elements are shared data elements, then the program (block 604) forms a message requesting the data record defining the data object for the operational task identified by the application and sends the message to data directory 150. Upon receipt of the message, data directory 150, using an identifier that is contained in the message and that identifies the operational task that will use the data, translates the identifier into a memory location. Data directory 150 then accesses that memory location in associated memory to retrieve a copy of the data record defining the data object needed to verify the consistency of the data that will be processed by the specified task. Data directory 150 then sends the copy of the data record to the IDM 115-1 which originated the request.

Upon receipt of the record from data directory 150, the program (block 605) assembles the required data object by collecting all of the data elements identified in the record received from data directory 150. In doing so, the program forms and sends a message requesting data to each of the other IDMs 115*i*, e.g. IDM 115-2 and 115-3, whose associated data base 125*i* contains data elements identified in the received record. Responsive to receipt of such a message, a receiving IDM 115*i*, e.g. IDM 115-2, retrieves in a conventional manner a copy of the requested data from its associated application data base, e.g. 125-2, and returns the copy to the IDM 115*i* program that requested the data. The IDM 115*i* program, responsive to receipt of the requested data elements from its own data base and from other IDMs 115*i*, assembles the received data into the desired data object and stores the data object in associated memory.

Following through on the example, the program (block 606) then processes the contents of the data object in accord with the rules stored in its associated rule base 120*i* to determine if the data elements forming such contents are logically consistent with each other. Such processing typically involves invoking a series of steps that compare multiple data elements in the data object with (a) each other, and (b) reference values encoded in the rules, to determine if the data elements satisfy the conditions specified in the rules. If the program finds that the data elements satisfy the conditions specified in a particular rule, then the program concludes that the data elements "pass", i.e., are consistent with respect to that rule. Otherwise, the program concludes that the data elements "fail" that rule, i.e., are inconsistent with respect to that rule.

In the same manner, the program (block 606) processes the data object for each rule in rule base 120-1 defined for that data object. If the program (block 607) determines that the data object passes each such rule, then the program (block 614) supplies the requested data to the application. If, on the other hand, the program (607) determines that the data object failed one or more rules, then the program (block 608) may apply so-called correction rules stored in rule base 120-1 as a way of attempting to reconcile the inconsistency using other data elements in the data object (and possibly by using other data elements outside the data object retrieved for just this purpose). If the program (block 609) finds that such correction rules are successful—meaning that one or more elements of the data object were changed to get the data object to pass all of the previously failed rules—then the program (block 616) sends the changes (update) to all of the IDMs whose associated data bases contain the data elements to be corrected. Such sending directs those IDMs to make the same data element corrections as were made in the data object. Where such correction rules exist and can be successfully applied, the result will be that the data object will be ultimately found to be consistent. Following the sending of the updates to the affected IDM's, the program (block 614) supplies the requested data to the application.

When the application of correction rules fail to make a data object consistent, the program (block 610) sends a request to data reconciliation process (DRP) 175 to reconcile the data forming the data object and then the program (block 611) evaluates the result to see if the data object is consistent. If so, the program (614) supplies the requested data to its associated application 110-1 to complete the desired operational task. If not, and the program concludes that the inconsistency can not be corrected by the application of respective correction rules, then the program consults its rule base to determine what action to take to deal with the inconsistent data. For example, the rule base may instruct the program to (a) instruct the requesting application to suspend the operational task if it is in progress, and wait until the data inconsistency has been reconciled by the Data Reconciliation Processor (DRP) 175 (FIG. 1), (b) supply the requested but inconsistent data to the application together with a warning noting the inconsistency, or (c) refer the inconsistent data object to DRP 175 with a request to initiate a search for alternative data, as is illustrated in FIG. 6 (block 612).

Specifically, responsive to receipt of a data object containing inconsistent data from an IDM 115*i*, DRP 175 processes the data object in accord with a set of correction rules contained in its associated rule base 180. Using such correction rules, DRP 175 attempts to reconcile inconsistent data elements using information already in the data object, and possibly also other data elements outside the data object (called reference data elements) that may be retrieved from other data bases 125*i*. Such other data may serve to substantiate or invalidate the value of a particular data element in the data object. The rules that DRP 175 uses are based upon knowledge obtained from by experts having particular experience with respect to evaluating and resolving inconsistency in data elements.

For example, a cable pair status from the provisioning portion of the data object (i.e. that portion of the data object whose data elements are taken from the provisioning data base 125-2, FIG. 1) may be "available", meaning that the cable pair is serviceable and available for assignment, i.e. not currently in use. However, if at the same time the cable pair status in the maintenance portion of the data object (obtained from maintenance data base 125-3, FIG. 1) is "unavailable", and this inconsistency can not be resolved by the IDM 115*i* rule base, then the inconsistency may be referred by that IDM to DRP 175 for reconciliation. DRP 175, using the rules encoded in rule base 180, tries to determine which data element is correct, i.e., the cable status shown in the provisioning portion of the data object, or the cable pair status shown in the maintenance portion.

As a further example, the rules in rule base 180 may direct DRP 175 to make that determination by checking the most recent date that a trouble was reported on the cable pair. DRP 175 would then access the maintenance data base 125-3 via its associated IDM 115 to obtain the data element recording that date. If the date is within a specified period of time, for example, in the last seven days before the current date, then rule base 180 might direct DRP 175 to (a) declare that the cable pair is indeed out of service, (b) correct to "unavailable" the value of the cable pair status in the provisioning portion of the data object, and (c) send to IDM 115-2 a request to update to "unavailable" the cable pair status in the provisioning data base 125-2. DRP 175 then continues in a similar manner to reconcile any other inconsistent data in the data object.

If the aforementioned date of the most recent reported trouble is not within the specified period of time, then rule base 180 may, for example, direct DRP 175 to declare that the correct cable pair status is "available", and update to "available" the cable pair status in the maintenance portion of the data object, as well as in the maintenance data base 125-3. When DRP 175 completes the reconciliation function in this manner, all logically-related data elements in the data object, and in the respective data bases from which the data object's data elements are drawn, will be consistent according to the rules in rule base 180.

If DRP 175 can not determine conclusively with the available information the correct value for the cable pair status, rule base 180 may direct DRP 175 to produce a message or report requesting a manual data base check, and/or a field verification of the cable pairs involved. At this point, DRP 175 may send a message to IDM 115*i* indicating it was not able to reconcile the inconsistency, whereupon IDM 115*i*, in accordance with operational rules in its associated data base 120-i, may discard the data object and initiate a search for alternative data.

Assume that the data object can be made consistent without such manual verification, and that IDM 115*i* had suspended the operational task and was waiting for a response from DRP 175 in accord with case (a) mentioned above. Then DRP 175 will return the now consistent data object to IDM 115*i* with a message indicating that the inconsistency has been reconciled. IDM 115*i*, in accord with its own operational rules stored in its associated rule base 120*i*, may (a) then revalidate the data object to confirm the consistency in accord with the validation rules stored in that rule base, (b) go on to another interim task, or (c) immediately supply the requested data to the requesting application.

With the foregoing in mind, an illustrative example of applying the principles of the invention will now be discussed, using the operational task of provisioning a leased lines circuit. Assume that the system illustrated in FIG. 1 is associated with a telecommunications system and comprises three applications supported by facilities processor 100-1, provisioning processor 100-2 and maintenance processor 100-3.

Also assume that the three applications have as part of their associated data bases data elements which describe particular transmission paths available in the telecommunications system, namely, path id, facility type, end points, and current operational status. The data elements also describe (a) the circuits already in use in the network (circuit id, circuit type, component path segments, circuit end points, and current operational status), and (b) maintenance troubles recently incurred (trouble record id, affected path id, date last trouble reported, and date last trouble cleared). Some of these data elements are local to only one application, and the rest are shared among two or all three of the applications. The identities of the particular data elements and their type (local, primary shared, or secondary shared) are recorded in the data element tables in each of the data bases respectively associated with the three applications, such as Table 300 illustrated in FIG. 3 for the provisioning data base. Master data element table 400, FIG. 4, contains all of the data element table information and cross-references needed to identify shared data elements stored in different data bases. The data object defined for circuit provisioning, with all its constituent data elements, is stored in data directory 150, as shown in FIG. 5.

Assume at this point that a telephone customer places an order for a leased lines circuit from Denver to Chicago with an agent of the telecommunications system having control over provisioning application 110-2. The agent, in turn, communicates in a conventional manner with application 110-2 via provisioning processor 100-2 to ascertain the optimum routing for the requested circuit. The provisioning application in a conventional manner determines such optimum routing, and outputs (e.g., displays on a computer screen) information describing the requested routing. Such routing may comprise three segments, namely, segment A from Denver to Kansas City, segment B from Kansas City to St. Louis, and segment C from St. Louis to Chicago. The provisioning application may also output other aspects associated with the routing, e.g., service features, pricing, etc. If the output is acceptable to the customer, then the agent executes the order via the provisioning application, and waits for confirmation therefrom that appropriate facilities and segments are available and have been reserved for this customer order.

While the agent waits for such confirmation, the provisioning application 110-2 automatically initiates the process of finding specific path segments available to form the optimum route. To do this, application 110-2 supplies to its associated IDM 115-2 information describing the characteristics of the desired circuit and the need for optimum routing. It also requests from IDM 115-2 the circuit_id and path_id identifying each circuit segment that will form the route, and a confirmation of operational status (ckt_status) of each such circuit.

IDM 115-2, in turn, searches for three path segments that may be used to form the optimum route and have a path_status of "OK"—meaning that the path is both serviceable and available for assignment. Using the information provided by provisioning application 110-2 and the data elements stored in provisioning data base 125-2, IDM 115-2 first identifies the path_id's of those paths which qualify as good candidates for segments because they satisfy the specified circuit requirements and have a path_status of "OK". IDM 115-2 may also be directed to identify other suitable candidates with path status "NOK" (not serviceable) for evaluation, as discussed below. Once the candidate paths are identified, IDM 115-2 then ensures that the data elements describing each identified path candidate are consistent with any logically-related data elements in both the facilities and maintenance data bases 125-1 and 125-3, respectively. IDM 115-2 does this by (a) determining the identity and location of such related data elements, (b) retrieving those data elements, and (c) assembling them into the data object previously defined for the circuit provisioning task. IDM 115-2 then examines the data object according to the rules in rule base 120-2 to ensure that the data object conforms with (i.e., passes) all of the relevant rules stored therein, or can be corrected to pass all such rules.

IDM 115-2, more particularly, first consults data element table 300 stored in its associated data base 125-2 to determine which of the required data elements are identified as local and which are identified as shared. If some of the required data is found to be shared data, and therefore logically-related data elements are stored in other data bases, then IDM 115-2 sends a message to data directory 150 requesting a copy of the data record for the circuit provisioning data object, as discussed above. Data directory 150, in turn, returns the requested data record, in which the data record identifies (a) all of the data elements defined to be a part of the circuit provisioning data object, and (b) the data base respectively containing each such data element. The logical structure of the information contained in data directory 150 for the requested circuit provisioning data object is shown in FIG. 5. Using such information, IDM 115-2 then assembles and validates in sequence the respective data objects for the path candidates that could form the desired circuit segment. In particular, IDM 115-2 first collects all relevant data for path segment A from Denver to Kansas City. In doing so, IDM 115-2 obtains from its associated data base 125-2 all of the provisioning data elements identified in the data object. IDM 115-2 also obtains from IDM 115-1 and IDM 115-3 the related data elements that are respectively stored in facilities and maintenance data bases 125-1 and 125-3. IDM 115-2 assembles the latter data elements as they are received from those data bases into a circuit provisioning data object. IDM 115-2 then temporarily stores the assembled data object in internal memory so that the elements forming the stored data object may be analyzed for consistency in accord with the logical rules stored in rule base 120-2. An illustrative example of such logical rules is shown in FIG. 7. Accordingly, when IDM 115-2 has completed assembling the data object it then applies the logical rules to the data forming the object to determine if path A satisfies the specification set forth in the agent's order for the first segment of the desired circuit.

Specifically, the rules shown in FIG. 7 specify different actions that may be taken based on the value of the three path_status data elements obtained from the facilities, provisioning, and maintenance data bases, respectively. For the instant example, assume that the values for a path_status could be (a) "OK", which means that the path is serviceable and available for use in a circuit, (b) "NOK", which means that the path is unavailable due to a current trouble condition, or (c) "ON", which means that the path is working and has been assigned to another circuit. Also assume that all of the paths having a status of "ON" were "screened out" in an earlier candidate selection process, such that they need not be considered in the following discussion.

Assume at this point that the path_status received for Path A from each of the data bases 125-1 through 125-3 is "OK"—meaning that Path A meets technical requirements specified for the desired segment, is serviceable and available for assignment, and that all data elements defining Path A are consistent across data bases 125-1 through 125-3. Once the consistency of the data object for Path A has been validated in accord with the rules in rule base 120-2, then IDM 115-2 again in accord with those rules reserves Path A as the first segment of the desired circuit. IDM 115-2 does this by creating a record for circuit segment 1 with the value of the path_id for Path A, and by updating the path_status for Path A in data bases 125-1 through 125-3 from "OK" to "ON", since it is being assigned to this circuit.

Once IDM 115-2 has completed all tasks associated with reserving path A as the first segment of the desired customer circuit, then IDM 115-2 may then begin the process of determining if path B is a good candidate for the second segment of the desired circuit. Assume, then, that the path_status received from data bases 125-1 through 125-3 for path B are "OK", "NOK", and "OK", respectively. For this case, then, the rules (as shown in FIG. 7) instruct IDM 115-2 to check the value of the tbl_date_clr data element from data base 125-3. Assume that the tbl_date_clr element indicates that the last trouble on path B had been cleared three days prior to the date of current service request. For the purposes of this example, it is known by the skilled artisan that when the path_status for a circuit in the provisioning and facilities data bases disagree with each other and the maintenance data base indicates that the trouble in that path had been cleared within the last seven days, then it would be safe to assume that the path is OK, and that the data base which indicates "NOK" is not correct. In that case, then, the rule directs IDM 115-2 to instruct facilities IDM 115-1 to update data base 125-1 accordingly, i.e., correct the path_status data element for path B to "OK", and then to reserve path B as the second segment of the desired circuit. Once those activities are completed, IDM 115-2 may then process path C as a candidate for the final segment.

Similarly, IDM 115-2 processes the data for path C to determine if it is acceptable for use. Assume at this point that the path_status received from (a) provisioning data base 125-2 is "NOK", (b) facilities data base 125-1 is "OK", and (c) maintenance data base 125-3 is "OK". Also assume that the tbl_date_clr element received from maintenance data base 125-3 indicates that the last recorded trouble was cleared more than seven days ago. Based on this information for this particular path_status, a skilled artisan would conclude that further investigation must be done to determine the cause of the inconsistency. The rules shown in FIG. 7, therefore, direct IDM 115-2 to reject Path C and to then locate an alternate path that may be used as the last segment in the circuit path C. Such rules also direct that the inconsistency in the path C data should be referred to DRP 175 for detailed processing. Accordingly, assume at this point that a further search indicates that alternate path C1 is available between St. Louis and Chicago, and that path C1 satisfies the rules stored in rule base 120-2 such that IDM 115-2 would be directed to reserve path C1 as the last segment in the desired circuit.

Once paths A, B, and C1 have been identified and reserved for the desired circuit, IDM 115-2 (a) associates the circuit with a unique circuit_id for this circuit; (b) records the path_id for the three selected segments as ckt_seg_1, ckt_seg_2, and ckt_seg_3, respectively; (c) records that the ckt_status is "OK", and (d) returns information to this effect to the provisioning application. The provisioning application, in turn, displays the information on the display of a computer operated by the aforementioned agent. The agent may then inform the customer that the desired circuit from Denver to Chicago has been confirmed.

FIG. 8 illustrates one example of logical rules that DRP 175 could employ to reconcile the aforementioned data for path C. To repeat the above example for path C, data bases 125-2, 125-1 and 125-3 indicated a path_status of "NOK", "OK", and "OK", respectively, with a tbl_date_clr of older than seven days. For this case, the DRP 175 rules specify checking the consistency of the path_type between the maintenance and facilities data bases as the next processing step. This is done since it is possible that a trouble report may have been recorded in the maintenance data base against the wrong path_id, and the most reliable source of path_type is contained in the facilities data base, where the primary shared copy for the path is stored. If the path_types match, then the data for the end points of path C are similarly checked. If either the path_type or end points are found to be inconsistent, then the DRP 175 rules specify that the data be checked manually, which might result in a field verification. If, on the other hand, DRP 175 finds that the data for the path_type and end points match, then the DRP 175 rules specify that the path_status recorded in the provisioning data base is incorrect, and direct an update of the path_status data element in that data base. At this point, then, since path C is no longer needed for the illustrative circuit, it is made available for use in another circuit.

The foregoing is merely illustrative of the principles of the invention. Those skilled in the art will be able to devise numerous arrangements, which, although not explicitly shown or described herein, nevertheless embody those principles that are within the spirit and scope of the invention.

I claim:

1. Apparatus comprising a plurality of independent data bases for storing data associated with respective ones of different applications, a plurality of data modules for interfacing respective ones of said applications with respective ones of the data bases, and means, contained in each of the data modules and responsive to receipt of a request from an associated one of said applications requesting particular data stored in the respective one of said data bases, for unloading the requested data from the respective one of said data bases and for communicating with individual other ones of said data modules to determine if the unloaded data is consistent with related data stored in their respective ones of said data bases.

2. The apparatus of claim 1 wherein said means for communicating includes means, operative in the event that said requested data is determined to be consistent with said related data stored in said associated ones of said data bases, for supplying said requested data to the associated one of said applications.

3. The apparatus of claim 1 wherein said means for communicating includes means, operative in the event that said requested data is determined to be inconsistent with said related data stored, for reconciling the inconsistency between said requested data and said related data.

4. The apparatus of claim 1 wherein each of said data modules is associated with respective rule bases, each of said rule bases comprising a plurality of specifications specifying how the associated module is to process related data that is inconsistent with requested data, and wherein said means for communicating includes means, operative in the event that said requested data is determined to be inconsistent with said related data, for processing said requested data and said related data in accordance with the specifications stored in the associated one of said rule bases.

5. The apparatus of claim 4 wherein said specifications include a specification to postpone supplying said requested data to said associated one of said applications until the inconsistency between said requested data and said related data is reconciled.

6. The apparatus set forth in claim 1 further comprising means for determining which of said associated ones of said data bases contain said related data, if any, and for sending a message requesting said related data to each of said associated ones of said data bases that contains said related data.

7. The apparatus set forth in claim 6 further comprising a Data directory for storing a plurality of records each identifying which of said data bases contain data related to requested data, and identifying which data elements in said data bases are related to said requested data.

8. Apparatus comprising a plurality of independent data bases, one of said data bases being associated with respective applications, said data bases containing data associated with said applications a plurality of data modules associated with respective ones of said data bases, means, contained in at least one of said data modules and responsive to receipt of a request from one of said applications requesting particular data contained in that one of said data bases respectively associated with said at least one of said data modules, for unloading said requested data from said one of said data bases, means, contained in said at least one of said data modules, for identifying which of other ones of said data bases contain data related to the requested and for sending a request for a copy of said related data to each of said other ones of said data bases via their respective data modules, and means, contained in said at least one of said data modules and responsive to receipt of said related data, for supplying said requested data and said related data to said one of said applications if said requested data and said related data are consistent with each other.

9. The apparatus of claim 1 wherein said means for communicating includes means, operative in the event that said requested data is determined to be inconsistent with said related data stored, for reconciling the inconsistency between said requested data and said related data.

10. The apparatus of claim 1 wherein said data modules are associated with respective rule bases each comprising a plurality of specifications specifying how the associated module is to process related data that is inconsistent with requested data, and wherein said means for supplying includes means, operative in the event that said requested data is determined to be inconsistent with said related data, for processing said requested data and said related data in accordance with the specifications stored in the associated one of said rule bases.

11. The apparatus of claim 10 wherein said specifications include a specification to post supplying said requested data to said associated one of said applications until the inconsistency between said requested data and said related data is reconciled.

12. The apparatus set forth in claim 8 further comprising a Data directory for storing a plurality of records each identifying which of said data bases contain data related to requested data, and identifying which data elements in said data bases are related to said requested data.

* * * * *